(12) United States Patent
Liljenberg et al.

(10) Patent No.: US 10,161,425 B2
(45) Date of Patent: Dec. 25, 2018

(54) HYDRAULIC STEERING SYSTEM

(71) Applicant: Danfoss Power Solutions ApS, Nordborg (DK)

(72) Inventors: Soeren Liljenberg, Soenderborg (DK); Tom Rudolph, Sydals (DK); Jens Vester, Soenderborg (DK); Tom Tychsen, Grästen (DK); Poul Ennemark, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 243 days.

(21) Appl. No.: 15/092,679

(22) Filed: Apr. 7, 2016

(65) Prior Publication Data

US 2016/0298658 A1   Oct. 13, 2016

(30) Foreign Application Priority Data

Apr. 8, 2015 (EP) .................... 15162771

(51) Int. Cl.

| | | |
|---|---|---|
| *B62D 5/093* | (2006.01) | |
| *F15B 13/04* | (2006.01) | |
| *B62D 5/32* | (2006.01) | |
| *F15B 11/08* | (2006.01) | |
| *B62D 5/097* | (2006.01) | |

(52) U.S. Cl.
CPC .......... *F15B 13/0401* (2013.01); *B62D 5/093* (2013.01); *B62D 5/32* (2013.01); *F15B 11/08* (2013.01); *B62D 5/097* (2013.01)

(58) Field of Classification Search
CPC .......... B62D 5/093; B62D 5/097; B62D 5/32
See application file for complete search history.

(56) References Cited

U.S. PATENT DOCUMENTS

| | | | |
|---|---|---|---|
| 3,348,493 A | 10/1967 | Easton | |
| 3,363,514 A | 2/1968 | Ramcke | |
| 4,372,413 A * | 2/1983 | Petersen | B62D 5/097 |
| | | | 137/625.23 |
| 4,412,415 A | 11/1983 | Thomsen et al. | |

FOREIGN PATENT DOCUMENTS

DE   1293029 B   4/1969

* cited by examiner

*Primary Examiner* — F. Daniel Lopez
(74) *Attorney, Agent, or Firm* — McCormick, Paulding & Huber LLP

(57) ABSTRACT

A hydraulic steering system (1) is provided having a steering device (2) and a symmetrically acting steering motor (3), said steering device (2) comprising a supply port arrangement having a high pressure port (P) and a low pressure port (T), a working port arrangement having two working ports (L, R), a control valve (14), two working lines (18, 19) each connecting said control valve (14) with one of said working ports (L, R), and a measuring motor (23). Such a hydraulic steering system should show a comfortable steering behavior. To this end said measuring motor (23) is arranged in one of said working lines (18, 19).

11 Claims, 1 Drawing Sheet

HYDRAULIC STEERING SYSTEM

CROSS REFERENCE TO RELATED APPLICATION

Applicant hereby claims foreign priority benefits under U.S.C. § 119 from European Patent Application No. EP15162771 filed on Apr. 8, 2015, the content of which is incorporated by reference herein.

TECHNICAL FIELD

The present invention relates to a hydraulic steering system having a steering device and a symmetrically acting steering motor, said steering device comprising a supply port arrangement having a high pressure port and a low pressure port, a working port arrangement having two working ports, a control valve, two working lines each connecting said control valve with one of said working ports, and a measuring motor.

BACKGROUND

Such a steering system is used to steer a vehicle, for example a truck or a tractor.

The driver actuates a steering member, for example a steering wheel, which is connected to the control valve. Depending on the direction of the steering movement the control valve opens the flow path from the high pressure port to one of the working ports and another flow path from the other working port to the low pressure port. In each flow path a number of orifices or bleeds are arranged. Before entering the control valve the fluid from the high pressure port is guided through the measuring motor. The measuring motor acts on the control valve in a sense to close the above mentioned flow path when an amount of hydraulic fluid corresponding to the intended steering angle of the steering member has been delivered or metered to the respective working port.

In many cases the control valve comprises a housing having a bore in which a spool and a sleeve are positioned. The spool and the sleeve can be rotated relative to each other to open the above mentioned flow paths and to close other flow paths, if appropriate.

Such a steering system has the drawback that a change from one steering direction to the opposite steering direction shows a certain gap or dead zone. In other words, when the steering direction is changed a certain time passes before the steering motor can react to the new steering command. This makes in some cases steering difficult and uncomfortable.

SUMMARY

The object underlying the invention is to show a hydraulic steering system having a comfortable steering behavior.

This object is solved with a hydraulic steering system as described at the outset in that said measuring motor is arranged in one of said working lines.

The function of the measuring motor is the same as before. It meters the amount of hydraulic fluid passing to the working port and resets the control valve, i.e. closes respective fluid paths and opens other fluid paths, if appropriate, when the required amount of hydraulic fluid has passed to the respective working port. However, when the steering direction is changed there is no dead band or time gap between steering in one direction and steering in the opposite direction. This makes steering more comfortable.

In a preferred embodiment said control valve comprises a neutral position in which said two working lines are connected. In this way it is possible to use the measuring motor as auxiliary pump in case that the pressure at the high pressure port is not high enough for steering, for example due to a failure in the motor of the vehicle driving the main pump supplying the steering system with hydraulic fluid. When the supply pressure at the high pressure port is not sufficient to actuate the steering motor, the necessary hydraulic pressure can be generated with means of the measuring motor. Since the measuring motor is directly arranged between the two ports of the steering motor, a direct steering of the steering system is possible. The measuring motor is actuated by the steering member, for example by the steering wheel.

Preferably in said neutral position said high pressure port and said low pressure port are connected to each other via throttling means. In this way an open center steering device is realized. The throttling means prevent a too large flow through the steering device. However, the steering device can be kept on a temperature corresponding to the temperature of the hydraulic fluid.

Preferably said throttling means comprise a first bleed between said high pressure port and a connection of said two working lines. In this way the hydraulic fluid supplied to the high pressure port of the steering device is throttled before it can reach the connection between the two working ports. The two working ports are prevented from being permanently loaded by the pressure of the high pressure port.

Furthermore, it is preferred that said throttling means comprise a second bleed between said low pressure port and said connection of said two working ports. The first bleed and the second bleed form a pressure divider with which an ideal pressure at the working port can be adjusted.

Preferably said measuring motor comprises two measuring motor ports, each measuring motor port being connected to said working line and each measuring motor port being connected to a tank via a check valve opening in a direction to said measuring motor port. The check valves close in a direction towards said tank. Therefore, during normal operation there is no risk that hydraulic fluid under pressure escapes to the tank. However, in an emergency situation it is possible that the measuring motor sucks hydraulic fluid from the tank to supply it to the steering motor.

Preferably said high pressure port and said low pressure port are connected by means of a port check valve opening from said low pressure port to said high pressure port, wherein releasable blocking means are located between said low pressure port and said tank. When in an emergency steering situation the measuring motor acts as pump supplying hydraulic fluid under the required pressure to the steering motor and the steering motor is moved in a direction decreasing the volume of the pressure chamber to which the measuring motor is connected, pressure builds up at the low pressure port of the steering device. This pressure cannot escape to the tank due to the blocking means. This pressure can, however, open the port check valve to feed the hydraulic fluid under pressure to the high pressure port and to supply the hydraulic fluid to the pressure chamber having the increasing volume. During normal operation the port check valve prevents a short circuit between the high pressure port and the low pressure port and the blocking means are open.

Preferably said blocking means are in form of an over center valve. An over center valve can operate on basis of pressures in the hydraulic steering system so that no external commands are necessary in order to open or release the blocking means.

In a preferred embodiment said over center valve comprises a first actuating port and a second actuating port, said first actuating port being connected to said low pressure port and said second actuating port being connected to said measuring motor and said working port connected to said measuring motor. In this way it is possible to open the blocking means based on two pressure signals. One pressure signal is the pressure at the low pressure port and the other pressure is basically the pressure in one of the pressure chambers of the steering motor. Both pressure signals are sufficient to reliably operate the over center valve.

In this case it is preferred that a first opening pressure at said first actuating port is lower than a second operating pressure at said second actuating port. Already a rather low second pressure is sufficient to open the over center valve. This pressure can be smaller than the normal operating pressure of the hydraulic steering system so that during normal operation the blocking means are always open. The first opening pressure is higher. The opening of the over center valve by means of the first opening pressure is more or less a safety measure to avoid an overload of the tank line and parts connected to the tank line.

In a preferred embodiment an over center check valve is located in a valve element of said over center valve. This is an additional safety measure in case the valve element of the over center valve is blocked. In this case the over center check valve allows escape of hydraulic fluid under a too high pressure.

BRIEF DESCRIPTION OF THE DRAWINGS

A preferred embodiment of the invention will now be described in more detail with reference to the drawing, wherein.

DETAILED DESCRIPTION

Figure 1:
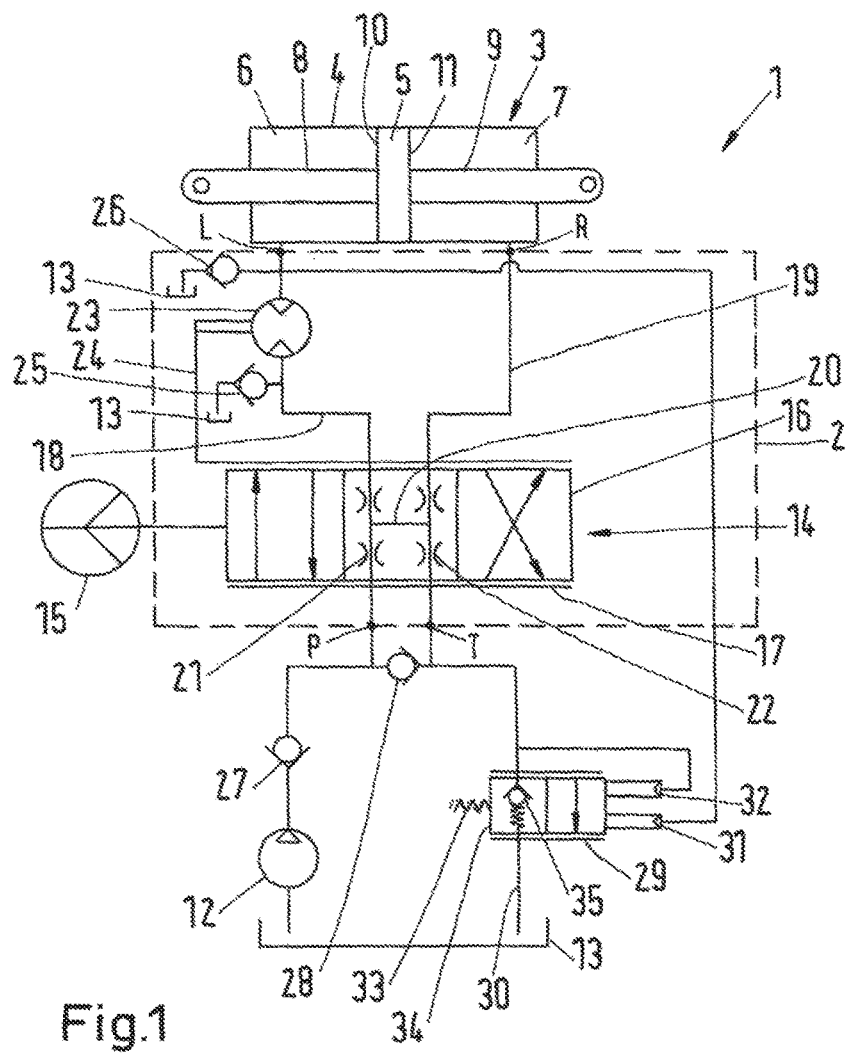
FIG. 1 shows schematically a hydraulic steering system.

A steering system 1 comprises a steering device 2 and a steering motor 3.

The steering motor 3 is a symmetrically acting steering motor. In the present case the steering motor 3 is in form of a cylinder 4 in which a piston 5 is arranged. The piston 5 divides the interior of the cylinder in a first pressure chamber 6 and a second pressure chamber 7. The piston 5 is provided with a first piston rod 8 running through the first pressure chamber 6 and with a second piston rod 9 running through the second pressure chamber 7. The piston rods 8, 9 have the same diameter. Therefore, the piston 5 comprises a first pressure area 10 in the first pressure chamber 6 and a second pressure area 11 in the second pressure chamber 7, wherein the first pressure area 10 and the second pressure area 11 are of the same size.

The steering device 2 comprises a supply port arrangement having a high pressure port P and a low pressure port T. As shown, the high pressure port P is connected to a pump 12 which is driven by a motor (not shown) of a vehicle to be steered by said steering system 1. The low pressure port T is connected to a tank 13.

The steering device 2 furthermore comprises a working port arrangement having a first working port L and a second working port R. The first working port L is connected to the first pressure chamber 6 and the second working port R is connected to the second pressure chamber 7.

The steering device 2 comprises a control valve 14. The control valve 14 is connected to a steering wheel 15 or any other steering member. More precisely, the control valve 14 comprises a spool 16 which is rotatably arranged within a sleeve 17. Upon actuation of the steering wheel 15 spool 16 is rotated relative to sleeve 17 to open and close fluid paths which will be explained below.

The steering device 2 comprises a first working line 18 connecting the control valve 14 with the first working port L and a second working line 19 connecting the control valve 14 and the second working port R.

The figure shows the neutral position of the control valve 14. In the neutral position the control valve 14 forms a connection path 20 connecting the two working lines 18, 19. The connection path 20 is connected to the high pressure port P via first throttling means 21 and to the low pressure port T via second throttling means 22. In the neutral position of the control valve 14 a flow of hydraulic fluid from the pump 12 to the tank 13 is possible. However, the flow is limited by the two throttling means 21, 22. Throttling means 21, 22 form a pressure divider. When throttling means 21, 22 have the same throttling resistance, a pressure in the connection path 20 corresponds to a half of the pressure difference between the high pressure port P and the low pressure port T.

In a first steering position control valve 14 connects the high pressure port P and the first working line 18 as well as the second working line 19 and the low pressure port T.

In a second steering position control valve 14 connects high pressure port P and the second working line 19 as well as the first working line 18 and the low pressure port T.

The steering device 2 furthermore comprises a measuring motor 23 which is located in the first working line 18. It could, however, be located in the second working line 19 as well.

The measuring motor 13 is driven by the hydraulic fluid passing through the first working line 18. As shown, the measuring motor is connected by means of a schematically shown connection 24 to the sleeve 17. The fluid passing the measuring motor 23 drives the measuring motor 23 and the sleeve 17 so that sleeve 17 follows the movement of spool 16 so that after a certain amount of hydraulic fluid has passed through control valve 14, control valve 14 assumes again the neutral position.

Since the measuring motor 23 is located in one of the working lines, in the present case in the first working line 18, there is no delay in actuating the measuring motor 23 when changing the steering direction.

The measuring motor 23 is connected to tank 13 by means of two check valves 25, 26, each check valve 25, 26 opening in a direction towards said measuring motor 23. This means that the measuring motor 23 can suck hydraulic fluid from tank 13 in each direction of operation, for example if hydraulic fluid is missing due to leakages or the like.

A pump check valve 27 is located between the pump 12 and the high pressure port P and opens in a direction towards the high pressure port P.

A port check valve 28 is located in a line connecting the high pressure port P and the low pressure port T and opens in a direction from the low pressure port T towards the high pressure port P.

Blocking means in form of an over center valve 29 are arranged in a tank line 30 connecting the low pressure port T and tank 13.

Over center valve 29 comprises a first actuating port 31 and a second actuating port 32. The first actuating port 31 is connected to the first working port L. The second actuating port 32 is connected to the low pressure port T. A spring 33 acts in a direction opposite to the direction of pressure at the two actuating ports 31, 32.

Over center valve 29 comprises a valve element 34 in which an over center check valve 35 is arranged. The over center check valve 35 opens in a direction from the low pressure port T to tank 13.

During normal operation pump 12 supplies hydraulic fluid under pressure from tank 13 to the high pressure port P. The pump check valve 27 is opened by this pump pressure and the port check valve 28 is closed. The steering direction is determined by the position of the control valve 14.

In an emergency steering mode the pressure of pump 12 is too low. In this case the steering wheel 15 is rotated in a direction in which the high pressure port P is connected to the measuring motor 23. The measuring motor 23 pumps hydraulic fluid under pressure into the first pressure chamber 6. Hydraulic fluid escaping from the second pressure chamber 7 can build up a pressure at the low pressure port T since the over center valve 29 is closed by means of spring 33. There is not sufficient pressure at the first actuating port 31 and there is no sufficient pressure at the second actuating port 32. The pressure at the low pressure port T can open the port check valve 28. However, if the pressure at the low pressure port T becomes too high, the over center valve 29 is opened due to the pressure at the second actuating port 32.

If in the emergency steering mode the steering wheel is rotated in the opposite direction the measuring motor 23 sucks hydraulic fluid out of the first pressure chamber 6 thereby lowering the pressure at the first working port L and lowering the pressure at the first actuating port 31 of the over center valve 29 thereby closing the over center valve 29 by means of the action of the spring 33.

Hydraulic fluid pressurized by the measuring motor 23 is guided to the low pressure port T and builds up a pressure opening port check valve 28 so that the pressurized hydraulic fluid can reach the second working port R and can be supplied to the second pressure chamber 7.

Figure 2:
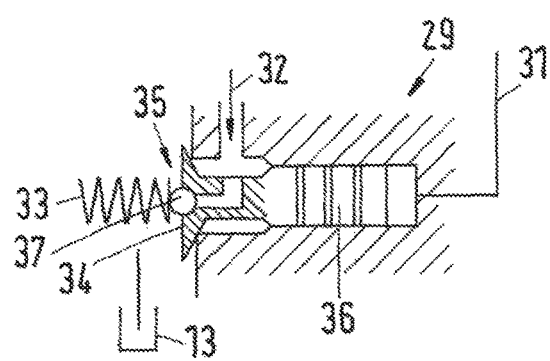
FIG. 2 shows schematically an over center valve.

FIG. 2 shows schematically the functional elements of the over center valve 29.

Over center valve 29 comprises the valve element 34 which is connected to a piston 36. The valve element 34 is directly loaded by a pressure at the second actuating port 32 and indirectly loaded by the pressure at the first actuating port 31 via said piston 36. The effective pressure area of piston 36 is, for example, by the factor 5 larger than the effective pressure area of valve element 34. Therefore a much lower pressure at the first actuating port 31 is sufficient to move valve element 34 and to open over center valve 29.

The over center check valve 35 comprises a check valve element 37 which is loaded by spring 33 (or another spring, if appropriate). When, for example, valve element 34 of over center valve 29 is blocked by dirt or any other means, the check valve element 37 can be lifted from the valve element 34 when the force generated by the pressure at the second actuating port 32 exceeds the force of spring 33.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering system having a steering device and a steering motor, said steering device comprising a supply port arrangement having a high pressure port (P) and a low pressure port (T), a working port arrangement having two working ports (L, R), a control valve, two working lines each connecting said control valve with one of said working ports (L, R), and a measuring motor, wherein said measuring motor is arranged in one of said working lines, wherein said high pressure port (P) and said low pressure port (T) are connected by means of a port check valve opening from said low pressure port (T) to said high pressure port (P), wherein releasable blocking means are located between said low pressure port (T) and said tank.

2. The hydraulic steering system according to claim 1, wherein said control valve comprises a neutral position in which said two working lines are connected.

3. The hydraulic steering system according to claim 2, wherein in said neutral position said high pressure port (P) and said low pressure port (T) are connected to each other via throttling means.

4. The hydraulic steering system according to claim 3, wherein said throttling means comprise a first orifice between said high pressure port (P) and a connection of said two working lines.

5. The hydraulic steering system according to claim 4, wherein said throttling means comprise a second orifice between said low pressure port (P) and said connection of said two working ports (L, R).

6. The hydraulic steering system according to claim 5, wherein said measuring motor comprises two measuring motor ports, each measuring motor port being connected to said one of said working lines and each measuring motor port being connected to a tank via a respective check valve opening in a direction to said measuring motor port.

7. The hydraulic steering system according to claim 4, wherein said measuring motor comprises two measuring motor ports, each measuring motor port being connected to said one of said working lines and each measuring motor port being connected to a tank via a respective check valve opening in a direction to said measuring motor port.

8. The hydraulic steering system according to claim 3, wherein said measuring motor comprises two measuring motor ports, each measuring motor port being connected to said one of said working lines and each measuring motor port being connected to a tank via a respective check valve opening in a direction to said measuring motor port.

9. The hydraulic steering system according to claim 2, wherein said measuring motor comprises two measuring motor ports, each measuring motor port being connected to said one of said working lines and each measuring motor port being connected to a tank via a respective check valve opening in a direction to said measuring motor port.

10. The hydraulic steering system according to claim 1, wherein said measuring motor comprises two measuring motor ports, each measuring motor port being connected to said one of said working lines and each measuring motor port being connected to a tank via a respective check valve opening in a direction to said measuring motor port.

11. A hydraulic steering system having a steering device and a steering motor, said steering device comprising a supply port arrangement having a high pressure port (P) and a low pressure port (T), a working port arrangement having two working ports (L, R), a control valve, two working lines each connecting said control valve with one of said working ports (L, R), and a measuring motor, wherein said measuring motor is arranged in one of said working lines, wherein said measuring motor comprises two measuring motor ports, each measuring motor port being connected to said one of said working lines and each measuring motor port being connected to a tank via a respective check valve opening in a direction to said measuring motor port.

* * * * *